Patented Aug. 31, 1954

2,688,003

UNITED STATES PATENT OFFICE 2,688,003

PREPARATION OF SPHEROIDAL SILICA ALUMINA CATALYST

Lloyd B. Ryland, El Cerrito, Calif., assignor to Shell Development Company, Emeryville, Calif., a corporation of Delaware No Drawing. Application May 14, 1951, Serial No. 226,280

4 Claims. (Cl. 252—455)

This invention relates to a new and improved method for the preparation of silica-alumina gel catalyst in the form of spheroids having a diameter of less than one millimeter.

Silica and alumina when properly combined in gel form exert striking catalytic activity and this combination catalyst has, consequently, found use for a variety of purposes. One important application is in the catalytic conversion of hydrocarbons. In many applications of such catalysts it is desired to pass the catalyst through a reaction zone and, in such cases, it is desired to have the catalyst in the form of small pieces. This is particularly the case when the so-called fluidized catalyst technique is applied. Here the catalyst is used in the form of particles less than one millimeter in diameter (usually about 30 to about 200 microns diameter) and is maintained in the so-called fluidized (pseudo liquid) state by a gas or vapor. In the past, the catalyst for this and similar applications has been prepared by first preparing the silica-alumina hydrogel under special conditions affording a catalytically active composite, after which the hydrogel was thoroughly washed, dried, calcined, and ground to the desired degree of fineness. Silica-alumina catalyst prepared in this manner is presently used in nearly all of the fluidized catalyst catalytic cracking plants. This catalyst is good and is not excessively costly but has the disadvantage that it tends to attrite rapidly under the conditions of use with the formation of considerable amounts of fine material (less than 20 microns) which is difficult to retain in the system and is also objectionable for other reasons.

In order to decrease the loss of relatively costly catalyst through attrition, it has been tried to produce the catalyst in the form of smooth spheroids. Large spheroidal particles, e. g., 5 millimeters diameter, can be quite efficiently produced by various methods including, for example, the method described in U. S. Patent No. 2,387,596. For the production of microspheroidal particles, however, it is necessary to use some sort of spray method and no matter how carefully such methods are regulated, or what type of equipment is used, the product invariably consists of particles of a large range of size and is made up to an appreciable extent of particles which are much smaller than desired. No practical method for reworking these fines is known.

Several methods involving spraying have been suggested for the production of microspheroidal particles. In the method used commercially for producing microspheroidal catalyst particles, the silica-alumina hydrogel is first produced (see U. S. Patent No. 2,478,599). This hydrogel is then washed, filtered, slurried in water, and then spray dried. (See British Patent No. 644,322.) In this method, a considerable amount of material in the range of 0.1 to 10 microns diameter is produced and this is unavoidable. Formation of this material decreases the value of the product.

In the commercial method (and also in the described method for making the ground catalyst) the washing step is both difficult and costly. On the one hand, sodium silicate is invariably used as the source of the silica and, on the other hand, it is necessary that the finished catalyst be substantially free of sodium salts. The proper washing of the catalyst, therefore, requires very large quantities of purified water; also as the washing progresses, the hydrogel tends to peptize and filtration becomes increasingly difficult. Also in the prior art methods large amounts of sulfuric acid and ammonium hydroxide are consumed to neutralize the sodium silicate and the aluminum salt, respectively.

A primary object of the present invention is to provide a method for the production of silica-alumina gel catalyst particles of less than 1 millimeter diameter and of spheroidal shape which is simple, practical, and less costly than previous methods. Another primary object of the invention is to provide for the production of microspheroidal particles of silica-alumina or silica-alumina-magnesia gels by an improved method which is advantageous with respect to the cost of the raw materials, chemical reagents, simplicity, low cost of apparatus required, and low cost and ease of control of the method itself. A particular object of this invention is to provide a method for the commercial production of spheroidal silica-alumina gel catalyst particles of more uniform size. A further particular object of this invention is to provide a method for the production of silica-alumina gel catalyst particles wherein the usual step of forming a silica sol or gel with consequent consumption of acid is avoided. A still further object of the invention is to provide a method for the production of silica-alumina gel wherein the usual consumption of alkali is decreased. Another object of the invention is to provide a method for the production of silica-alumina gel catalyst wherein the step of washing is simplified and the amount of purified water required is reduced. Another object of the invention is to provide a method whereby spheroidal silica-alumina particles having very fine pores may be produced.

In broad general outline silica-alumina gel catalists are prepared in microspheroidal form according to the present invention by first forming microspheroidal sodium silicate particles of suitable composition and size range and then reacting the thus-formed particles with a solution of an aluminum salt of an acid stronger than silicic acid under conditions precluding appreciable solution of the sodium silicate. The resulting composite gel microspheroids are then worked up into the finished catalyst as will be described.

As stated by Vail ("Soluble Silicates in Industry," A. C. S. Monograph No. 46, page 108), "Probably no product of chemcial industry comes upon the market in a greater variety of forms than the soluble silicates. As the ratio to alkali to base is not limited to any stoichiometric boundaries, the number of different products is limited only by the precision with which we choose to define them. As a practical matter, the limits are set by the metasilicate, $Na_2O \cdot SiO_2$ on the side of maximum alkalinity, and the highest silica is found in a sodium silicate solution having the composition $Na_2O \cdot 4.2SiO_2$, although still higher ratios can be secured in more dilute solutions should they be required."

"Three groups of products are found: first, anhydrous silicates as glasses or powders formed by fusion processes; second hydrous solids formed by hydration of glasses or evaporation of solutions; and third, the solutions among which there are greater differences than is generally known."

Sodium silicates may be produced in the form of small spheroidal praticles in a number of ways. In one method, the molten glass is sprayed by impingement of a high velocity jet of steam. The product is a substantially anhydrous microspheroidal powder.

Another method is to spray dry a solution of the sodium silicate. (See for example, British Patent No. 203,749 and U. S. Patents Nos. 1,198,203 and 1,194,827.) The sodium silicate solution may be sprayed into a heated gas using either an open or closed type homogenizing atomizer (centrifugal), or by means of a pressure nozzle or a two-fluid nozzle. A pressure nozzle is more trouble-free but affords a lower production rate. A two-fluid nozzle tends to give a greater proportion of fine material and is advantageous when a very fine product is desired. A suitable product can be produced in conventional spray driers of which the Peebles drier, the Kestner drier, and the Bowen spray chamber are examples. The product obtained by spray drying a solution of sodium silicate may be substantially anhydrous or hydrated to any desired degree depending upon the extent of drying effected. The advantage of dissolving the glass to give a sodium silicate solution and then spray drying is, in practice, that a free-flowing hydrated product having a very high rate of solution may be obtained and, consequently, commercial spray drying is controlled to give such a product.

Another method for producing sodium silicate in the form of spheroidal particles is to form droplets of a sodium silicate solution and then dehydrate and thus rigidify them by osmotic extraction of water as described in U. S. Patent No. 2,284,248. The spheroids produced by this method are hydrated to a high degree and require subsequent further drying to prevent them from sticking together and forming a solid cake.

As previously pointed out, all such methods involving spraying invariably produce a substantial amount of very fine material. When spraying the silica-alumina hydrogel or forming the hydrogel by spray methods, this fine material cannot be conveniently reused. The extra fine sodium silicate can, however, be readily redissolved and resprayed. The particles which are smaller than desired, e. g., below 30 microns diameter, may be separated from the product by sieving, air elutriation, or any other suitable method. Since the off-size material may be reused so conveniently, it is practicable to separate quite narrow selected fractions, e. g., 100–150 microns, for use in the subsequent step and to redissolve the remainder.

While spheroidal sodium silicate particles suitable for use in the present process may be prepared by any of the above methods, not all spheroidal sodium silicates produced by these methods are suitable. Also, as will be explained, the sodium silicates prepared by these different methods are not equivalent and, in some cases, an intermediate treatment is necessary.

The spheroidal silica-alumina catalyst particles are prepared by reacting the solid spheroidal particles of sodium silicate with an aluminum salt of an acid stronger than silicic acid. The most desirable salts from the standpoint of cost and availability are the sulfate, chloride, and nitrate. However, a less soluble or more costly salt may also be employed, the essential requirements being that the solution be distinctly acid, of at least 0.05 molal concentration, and that the dissolved salt be more acidic than silicic acid. In the case of the chloride, the reaction may be represented by the following equation:

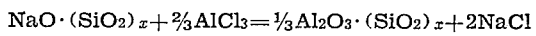

$$NaO \cdot (SiO_2)_x + \tfrac{2}{3}AlCl_3 = \tfrac{1}{3}Al_2O_3 \cdot (SiO_2)_x + 2NaCl$$

wherein $x$ is between about 1.6 and 4.2. In order to obtain spheroidal particles, the conditions must be adjusted and controlled to effect this reaction substantially to completion without destroying the spheroidal shape of the sodium silicate particles.

As pointed out, the commercially available spheroidal sodium silicate is produced primarily to provide a free-flowing material which may be quickly dissolved. Unless certain precautions and conditions are used, the reaction proceeds with solution of the sodium silicate and the product is a flocculent pericipitate, rather than the desired spheroidal silica-alumina gel particles.

There is no point at which a solution of sodium silicate of high ratio can be said to be saturated since homogeneous systems of the sodium silicate and water may exist in all proportions at ordinary temperatures. When considering spheroidal sodium silicates, it is, therefore, the rate of solution which is important, rather than the "solubility." The rate of solution of a sodium silicate depends upon the ratio of $SiO_2/Na_2O$, the state of hydration, the size of the particles, the temperature, the ratio of sodium silicate to solvent (water) and the degree of agitation.

With other conditions equal, the rate of solution of microspheroidal sodium silicate decreases with increasing ratio of $SiO_2/Na_2O$. For example, 33 grams of microspheroidal sodium silicate of $SiO_2/Na_2O$ ratio of 2 and state of hydration=17% $H_2O$, when stirred into 100 cc. of water at room temperature, is approximately 98% dissolved in 15 minutes. A comparable sodium silicate of lower $SiO_2/Na_2O$ ratio dissolves even faster.

With other conditions equal, the rate of solution of microspheroidal sodium silicate increases as the extent of hydration increases. For example, the above-mentioned hydrated sodium silicate dissolves rapidly whereas a completely dehydrated sodium silicate of the same ratio is more difficult to dissolve.

As would be expected, the rate of solution of a sodium silicate depends upon the particle size and increases as the particle size is decreased. It, therefore, happens that the tendency to dissolve and form the undesired flocculent precipitate is often markedly influenced by the smaller particles.

As indicated above, spheroidal silica-alumina gel particles are prepared according to the present invention starting with spheroidal sodium silicate particles in which the ratio of $SiO_2/Na_2O$ is between about 1.6 and 4.2. The catalysts obtained from such sodium silicate contain between about 12% and about 25% alumina on the dry basis. In order to produce spheroidal particles from these sodium silicates, it is necessary that the state of hydration be controlled. The desired range of suitable hydration cannot be more than approximately stated since it will vary from case to case, depending upon the factors noted. A completely anhydrous sodium silicate not only reacts slowly, but gives a quite dense product. A certain amount of hydration is, therefore, desirable and, in general, it is desirable to operate near the upper limit of hydration in any given case. The upper limit of hydration is that at which the rate of solution is sufficient to give a flocculent precipitate. Whether or not a sodium silicate is excessively hydrated may easily be determined in any given case by a simple laboratory test. A few grams (10 g.) of the spheroidal sodium silicate are poured and stirred into 100 cc. of a 0.5 molar solution of aluminum sulfate at room temperature. If the sodium silicate is excessively hydrated, a flocculent precipitate forms immediately. Depending upon the particle size and the ratio of $SiO_2/Na_2O$, sodium silicates hydrated to between about 8% water and about 19% water are suitable.

A catalyst of lower density may be produced with a sodium silicate of higher state of hydration if a sodium silicate is used which has been brought to the desired state of hydration by dehydrating. Thus, while sodium silicates produced by partially hydrating more anhydrous materials, e. g., by the methods disclosed in U. S. Patent No. 1,176,613, British Patent No. 23,391 (1911) or German Patent No. 210,885, may be used, the resulting catalyst is of higher density. The reason for this is that the smaller particles tend to hydrate to a greater extent and this greatly increases their already high rate of solution; consequently, a lower overall state of hydration is necessary to avoid precipitation. On the other hand, when bringing a sodium silicate to the desired state of hydration by dehydrating, e. g., by spray drying a sodium silicate solution, the finer particles tend to dehydrate more completely than the larger particles and this counteracts to a large extent the normal tendency for the smaller particles to dissolve more quickly and yield a precipitate.

When using a sodium silicate which has been brought to the desired state by partial hydration, it is desirable to allow the material to age for some time as this allows the overhydrated smaller particles and underhydrated larger particles to approach equilibrium of moisture content. On the other hand, it is desirable, but not essential, to employ spray dried sodium silicate relatively soon after drying in order to avoid further hydration of finer particles by establishment of equilibrium between the larger and smaller particles.

The allowable state of hydration may also be influenced and controlled to some extent by other factors. For instance, a material which is slightly overhydrated may be made suitable by treating it with a small amount of carbon dioxide. This tends to decrease the rate of solution of the particles. One method for such treatment is, for example, to pass a stream of gas containing some carbon dioxide, e. g., flue gas, up through the powdered sodium silicate in a storage bin at a rate to maintain the powder in an agitated pseudo liquid state. Further dehydration of overhydrated material may also be advantageously accomplished in the same manner if a hot substantially carbon dioxide-free gas is used. By maintaining the powder in the agitated pseudo liquid state by the drying gas, a very uniform and nicely controllable dehydration may be effected. In some cases the liquid characteristics of the powder may be enhanced by adding a small amount of powdered sodium sulfate.

The formation of the desired spheroidal silica-alumina gel particles from the spheroidal particles of the sodium silicate is effected by dispersing the latter in a solution of an acid salt of aluminum. The salt solution should be well agitated and the spheroidal sodium silicate particles should be added in sufficiently dispersed form to prevent agglomeration of the particles. One suitable method is to sift the sodium silicate onto the surface of the stirred solution. The amount of solution used should be at least ten liters per kilogram of the sodium silicate, and preferably at least twenty liters per kilogram. (Unlike most other solutes, sodium silicates tend to dissolve more rapidly in small quantities of solvent than in larger quantities.)

The solution of the aluminum salt should be distinctly acid at all times during the reaction. This condition can be maintained simply by using sufficient of the aluminum salt. It may also be maintained by the addition of a small amount of a mineral acid, e. g., $H_2SO_4$, HCl, $HNO_3$. The use of mineral acid is advantageous where it is desired to produce a product having a low concentration of aluminum, but for general catalysis it is desired to incorporate large amounts of aluminum and in most cases, therefore, the use of a mineral acid is disadvantageous.

As previously mentioned, it is essential that the finished catalyst be substantially free of sodium. For this reason, and also because a high aluminum content is desirable in the finished catalyst, it is desirable that the above-mentioned reaction be carried substantially to completion. It is, therefore, desirable that the solution contain an excess of the aluminum salt above the stoichiometric amount, e. g., 125% thereof. The initial solution may contain a lesser amount and additional aluminum salt may be added during the course of the reaction. Satisfactory results have been obtained with solution from as dilute as 0.05 molar up to substantially saturated solutions. The use of a large amount of a dilute solution, e. g., molar or less, is generally preferable to a small amount of a more concentrated solution.

Toward the end of the reaction the solution will contain an appreciable amount of the corresponding sodium salt. The salt tends to prevent the reaction from proceeding to completion; however, the mass action effect in this case is small and it is, therefore, possible to carry the reaction to substantial completion, particularly if a large amount of solution and a considerable excess of the aluminum salt is applied. After allowing the reaction to proceed to substantial equilibrium, the remaining trace of sodium may be removed from the spheroidal silica-alumina gel particles by washing with water and/or dilute acid. It is more advantageous, however, to treat the particles with a second solution of aluminum salt. In this latter step, it is advantageous to use aluminum nitrate.

While the described method is primarily designed to produce spheroidal silica-alumina gel catalyst, it is possible to modify it somewhat to incorporate a certain amount of magnesium in the catalyst. Thus, after the described reaction has proceeded to a considerable extent, e. g., 50% exchange of the sodium, the particles may be transferred to a solution of a magnesium salt, e. g., magnesium sulfate, where a corresponding exchange reaction takes place until the sodium is exhausted. It is essential that the solutions be used in the order mentioned. The incorporation of magnesium improves the catalyst somewhat for some purposes.

The product upon completion of the reaction consists of discrete, non-sticky spheroids of tough gel structure. The physical form and structure of the particles are conducive to rapid and efficient washing and filtration to remove adsorbed sodium salt without first drying. The ability to remove at least the greater part of adsorbed sodium salts before drying is an advantage since it allows better preservation of the microporous structure and also usually results in a product of somewhat better mechanical strength. If desired, however, the product may be first subjected to a mild drying treatment to improve the strength of the wet gel, e. g., drying to a water content of 15–30%, prior to washing, or the material may be washed both before and after such drying. The catalyst is preferably given a final calcination, e. g., at 300° to 700° C. to reduce the water content to between about 2% and 15%, but this step may be omitted or altered if desired. The particles at any stage after the reaction may be impregnated with small amounts of promoter materials to render them more suitable for a particular purpose. For example, the partially dried particles may be treated with a dilute solution of hydrogen fluoride to incorporate from 0.05 to 5% of fluorine.

The products obtained by the method described are microporous gels in which the silica and alumina are combined in a complex form exhibiting a high catalytic activity. It is found that the micropores of these gels are unusually fine. For instance, average pore radii of the order of 5–10 A° are usual. Such fine-pored material is particularly advantageous for some catalytic processes. For catalytic cracking, on the other hand, a material having larger pores is preferred. A product having larger pores may be produced by heating after some of the exchange reaction has proceeded. The sodium silicate is preferably added to the solution of the aluminum salt at normal temperature. After the reaction has proceeded for some time, however, the slurry may be heated. During the first few minutes of the reaction, e. g., 30 minutes at room temperature, the particles of sodium silicate swell appreciably. It is desirable to allow a few minutes for the swelling to take place before heating the slurry. A suitable temperature is, for example, 70°–100° C. but a higher or lower temperature may be used if desired. The described method where the reaction is initiated at essentially room temperature and then carried out at a higher temperature is not only advantageous in producing a product having the larger size pores desired for catalytic cracking, but is also advantageous in allowing the exchange reaction to be completed in a shorter time. It is particularly advantageous when, as described, the reaction of a part, e. g., 25–75% of the sodium is effected with the acid aluminum salt and the partially reacted particles are then transferred to a magnesium salt solution to complete the reaction.

The process is subject to considerable variation with respect to the specific materials employed, the proportions of such materials, the concentrations thereof, and the temperature, time, and other operating conditions employed. The essential features, as will be apparent from the above and the following examples, are that a sodium silicate in microspheroidal form and of appropriate size range is produced or chosen of such $SiO_2/Na_2O$ ratio and extent of hydration as to allow the desired exchange reaction to be carried out without loss of the microspheroidal form or the production of detrimental quantities of silica-alumina precipitate through solution of the sodium silicate particles in the reaction mixture.

*Example I.*—One part of hydrated sodium silicate ($SiO_2/Na_2O=1.00$) passing a 28 mesh sieve was dispersed in about 25 parts by weight of 0.33 molar aluminum chloride solution at 92° C. A flocculent silica-alumina precipitate resulted. After heating for about one hour at 80–100° C. for completion of the reaction, the material was washed and dried. The resultant product was made up of very fine irregular shaped particles and had a very low bulk density (0.15 gm./cc.). This example illustrates the type of product obtained when using a sodium silicate of too-low $SiO_2/Na_2O$ ratio.

*Example II.*—One part of microspheroidal (approximately 90% passing a 100-mesh screen) sodium silicate having a $SiO_2/Na_2O$ ratio of about 2.0 and containing about 17% water was poured into about 20 parts of vigorously agitated 0.5 molar aluminum chloride solution at room temperature (23° C.). The desired reaction took place with little precipitation. After allowing time for completion of the reaction, the product was filtered, washed with distilled water until the wash water was free of chlorides, and then dried at 120° C. The product was found to consist largely of spherical particles with some agglomerates composed of spherical particles and some irregular shaped particles. The material was found to have a surface area of about 374 m.²/g. and an average pore radius of 12 A°. The surface area of the original sodium silicate particles was about 1 m.²/g. This sodium silicate had about the maximum allowable rate of solution. The rate of solution could be decreased somewhat by further dehydrating the sodium silicate to about 15% water, or by increasing the $SiO_2/Na_2O$ ratio.

*Example III.*—One part of microspheroidal (approximately 90% passing a 100-mesh screen) sodium silicate having a $SiO_2/Na_2O$ ratio of about 3.2 and containing about 17% water was poured into about 50 parts of vigorously agitated 0.5 molar aluminum chloride solution at room temperature (23° C.). The desired reaction took place with no visible floc formation. After allowing time for completion of the reaction, the product was filtered, washed with distilled water until free of chlorides and dried at 120° C. The particles were found to have retained their spherical shape. The average pore radius of the product was found to be 7 A°.

*Example IV.*—Microspheroidal sodium silicate powder ($SiO_2/Na_2O=2.0$, 16.6% loss on ignition) was dispersed in a large excess of 0.5 molar aluminum chloride solution. After the reaction was completed, the product was filtered, washed and dried, as before. In another case this preparation was repeated in the same manner except that after a few minutes of reaction at room temperature the reaction was completed at about 83° C. In both cases the product consisted essentially of the desired microspheroidal silica-alumina gel particles. The surface areas of the products were 530 and 466 m.$^2$ g., respectively.

Microspheroidal sodium silicate $$(SiO_2/Na_2O=2.0)$$

16.6% loss on ignition) was sieved into about 8 parts of a vigorously stirred 0.5 normal aqueous aluminum chloride solution (23% excess aluminum chloride over the stoichiometric amount) at room temperature. After about 14 minutes, the reacting mixture was gradually heated to 83°–90° C. and an additional 5 parts of water were added. After reacting in this temperature range for about one hour and then standing 39 hours, the product was filtered, washed, and dried. The product consisted of microspheroidal particles of silica-alumina gel containing about 24.0% $Al_2O_3$ (dry basis). In order to apply a standardized activity test, the catalyst was pelleted with 4% Sterotex and 4% wheat flour and calcined for 6 hours at 565° C. The catalyst was found to have approximately the same cracking activity as a pelleted commercial silica-alumina cracking catalyst.

I claim as my invention:

1. The method for the production of microspheroidal silica-alumina gel catalyst which comprises dispersing microspheroidal particles of partially hydrated sodium silicate having a ratio of $SiO_2/Na_2O$ between 1.6 and 4.2 and a water content between about 8% and about 19% in an agitated cold solution of at least a 0.05 molar concentration of an aluminum salt of an acid selected from the group consisting of $H_2SO_4$, HCl, and $HNO_3$, said solution amounting to at least 10 liters per kilogram of said sodium silicate and containing at least 125% of the stoichiometric amount of $Al^{+++}$ equivalent to the $Na^+$ content of said sodium silicate, retaining the particles of sodium silicate in said solution until the reaction is substantially complete, separating the resulting microspheroidal gel particles from the said solution and washing, drying, and calcining the separated particles.

2. The method for the production of spheroidal particles of silica-alumina gel less than 1 millimeter diameter which comprises drying a hydrated microspheroidal sodium silicate of $SiO_2/Na_2O$ ratio between 1.6 and 4.2 until no precipitate is formed upon stirring 10 grams of the powder in 100 cc. of 0.5 molar aluminum sulphate solution at 23° C., dispersing the resulting dried powder in an agitated cold solution of at least 0.05 molar concentration of an aluminum salt of an acid selected from the group consisting of $H_2SO_4$, HCl, and $HNO_3$, said solution amounting to at least 10 liters per kilogram of said sodium silicate and containing at least 125% of the stoichiometric amount of $Al^{+++}$ equivalent to the $Na^+$ content of said sodium silicate, retaining the particles of sodium silicate in said solution until the reaction is substantially complete, separating the resulting microspheroidal gel particles from the said solution and washing, drying, and calcining the separated particles.

3. The method for the production of microspheroidal silica-alumina gel catalyst which comprises dispersing microspheroidal particles of partially hydrated sodium silicate having a ratio of $SiO_2/Na_2O$ between 1.6 and 4.2 and a water content of about 8% and 19% in an agitated solution of at least 0.05 molar concentration of an aluminum salt of an acid which is stronger than selicic acid, said solution amounting to at least 10 liters/kilogram of said sodium silicate and containing at least 125% of the stoichiometric amount of $Al^{+++}$ equivalent to the $Na^+$ content of said sodium silicate, thereafter heating the mixture to a temperature near the boiling point and retaining the mixture at said temperature until the reaction is substantially complete, separating the resulting microspheroidal gel particles from said solution, and washing and drying the separated particles.

4. The method for the production of composite gels of silica-alumina-magnesia in the form of spheroidal particles of less than one millimeter diameter which comprises dispersing, microspheroidal particles of partially hydrated sodium silicate having a ratio of $SiO_2/Na_2O$ between 1.6 and 4.2 and a water content between about 8% and 19% in an agitated cold solution of at least 0.05 molar concentration of an aluminum salt of an acid selected from the group of $H_2SO_4$, HCl, and $HNO_3$, said solution amounting to at least 10 liters per kilogram of said sodium silicate, retaining the particles of sodium silicate in said solution for a time sufficient to allow substantial but incomplete exchange of sodium, separating the resulting microspheroidal gel particles from said solution and dispersing them in a solution of a magnesium salt of an acid selected from the group consisting of $H_2SO_4$, HCl and $HNO_3$, said solution amounting to at least 10 liters/kilogram and containing at least 125% of the stoichiometric amount of $Mg^{++}$ equivalent to the residual $Na^+$ content of the material, retaining the particles in said latter solution until the exchange with sodium is substantially complete, separating the resulting microspheroidal gel particles from the said solution and washing, and drying the separated particles.

References Cited in the file of this patent

UNITED STATES PATENTS

| Number | Name | Date |
|---|---|---|
| 1,900,859 | Connolly et al. | Mar. 7, 1933 |
| 2,271,319 | Thomas et al. | Jan. 27, 1942 |
| 2,477,695 | Kimberlin | Aug. 2, 1949 |
| 2,506,316 | Pierce | May 2, 1950 |